Patented Sept. 7, 1943

2,328,844

UNITED STATES PATENT OFFICE 2,328,844

COATED RUBBER HYDROCHLORIDE FILM

Harold Judson Osterhof, Cuyahoga Falls, Ohio, assignor to Wingfoot Corporation, Akron, Ohio, a corporation of Delaware No Drawing. Application September 29, 1941, Serial No. 412,841

4 Claims. (Cl. 117—139)

This invention relates to a packaging material which is composed of Pliofilm, or other rubber hydrochloride film, coated with polyvinyl alcohol or aldehyde derivatives thereof. The invention will be described more particularly in connection with the use of polyvinyl alcohol, although it is to be understood that instead of the alcohol an aldehyde derivative thereof may be used. In using such derivatives other solvents than water may necessarily be used.

Pliofilm is a cast film produced by spreading or casting a rubber hydrochloride cement on a smooth surface and then allowing the solvent in the cement to evaporate. Films produced in this way may contain microscopic pin holes so fine as not to be detectable by the naked eye. Consequently when used for packaging a material under pressure or for packaging a material under vacuum, such films are not sufficiently impervious. Likewise they are not entirely satisfactory for packaging liquids having a low surface tension such as lubricating oil. Neither are they entirely impervious to oxygen and other gases. To make the films more impervious to the passage of liquids, e. g., oils such as essential oils, etc., oxygen and other gases, when used for packaging at normal pressure or under a vacuum, the rubber hydrochloride film is coated with polyvinyl alcohol or an aldehyde derivative thereof. The polyvinyl alcohol may be applied as an aqueous solution, and the water is evaporated after the coating is completed. The coat remaining after evaporation of the solvent may be a very thin coat such as a coat of from .0001 up to .001 of an inch or more. A coating several ten thousandths of an inch thick will be satisfactory for most packaging operations. A solution of an aldehyde derivative of polyvinyl alcohol, such as polyvinyl formal, polyvinyl acetal, polyvinyl butyral, etc. may be similarly used to form a coating on rubber hydrochloride film.

Rubber hydrochloride film is resistant to chemical and to petroleum products and to most oils and greases. Polyvinyl alcohol likewise is resistant to greases, etc., and is very impervious to oxygen. The composite sheet of this invention is therefore particularly suitable for packaging oils and greases and is likewise adapted for the formation of vacuum packages for coffee, cheese, meats and other foodstuffs, etc.

The rubber hydrochloride may be plasticized, and a plasticizer such as glycerol or polyglycerol may be incorporated in the polyvinyl alcohol. Either or both materials may be colored. The rubber hydrochloride may contain a stabilizer, although the stabilizer is not essential. As preferred, the package may be formed with the polyvinyl alcohol on the interior and the rubber hydrochloride on the exterior or the reverse.

Both the rubber hydrochloride and the polyvinyl alcohol may be sealed to themselves by heat. Packages may therefore be formed from the composite sheet of this invention by heat-sealing. An adhesive may be used if preferred.

The rubber hydrochloride film used in forming the preferred sheet of this invention is a flexible film which may be .001 of an inch thick. Thicker film may be used up to .0015 of an inch or thicker and film less than a thousandth of an inch thick may be used. This thinner film may be formed by stretching a cast film. The stretched film contains the pin holes of the cast film, only they are magnified by stretching. The stretched film may, for example, be .0004 to .0008 of an inch thick. The coated sheet is highly flexible, very resistant to the passage of moisture vapor and oxygen and therefore particularly adapted for the formation of vacuum packages for foodstuffs, etc.

Instead of coating the rubber hydrochloride film with the polyvinyl derivative, a film of the polyvinyl derivative may be coated on either or both sides with rubber hydrochloride, as a lacquer. This coated sheet may be used in the formation of a vacuumized package.

The package may be vacuumized in any suitable way. The foodstuff or other material to be packaged may be placed in a bag of the film formed with tight seams. The bag with contents may be placed in a chamber which is then evacuated. The bag may then be mechanically sealed within the vacuumized container. The seal may, for example, be formed by causing heated bars to press the mouth of the bag together and thus heat-seal it.

What I claim is:

1. A flexible film which is resistant to the passage of oxygen and moisture vapor, which comprises a layer of rubber hydrochloride and a layer of a polyvinyl derivative from the class consisting of polyvinyl alcohol and aldehyde derivatives thereof.

2. As a wrapping material a composite sheet formed of a film of rubber hydrochloride and a film of polyvinyl alcohol united directly to one another.

3. As a wrapping material a cast film of rubber hydrochloride coated with a film of polyvinyl alcohol.

4. A film of rubber hydrochloride coated with a plasticized polyvinyl alcohol.

HAROLD JUDSON OSTERHOF.